United States Patent [19]
Schluter et al.

[11] 3,986,520
[45] Oct. 19, 1976

[54] APPARATUS AND METHOD FOR FILLING AND REMOVING LIQUID BALLAST FROM TIRES

[75] Inventors: Roger L. Schluter, Sandwich; John R. Muntjanoff, Aurora, both of Ill.

[73] Assignee: Caterpillar Tractor Co., Peoria, Ill.

[22] Filed: Mar. 17, 1975

[21] Appl. No.: 558,979

[52] U.S. Cl. .............................. 137/212; 137/588
[51] Int. Cl.² .................................. B60C 29/00
[58] Field of Search .............. 137/588, 212, 572; 152/DIG. 5, 415

[56] References Cited
UNITED STATES PATENTS

| | | | |
|---|---|---|---|
| 2,339,381 | 1/1944 | Crowley | 137/588 X |
| 2,581,914 | 1/1952 | Darrow | 137/572 X |
| 2,707,967 | 5/1955 | Adams | 137/212 |
| 2,929,432 | 3/1960 | Kominic | 137/588 X |

*Primary Examiner*—Alan Cohan
*Attorney, Agent, or Firm*—Phillips, Moore, Weissenberger, Lempio & Strabala

[57] ABSTRACT

An apparatus for filling and removing liquid ballast from a tire comprises a fluid circuit including a pressurized air tank and a liquid storage tank each operatively connected to an adapter releasably attached to the rim of a tire in lieu of its conventional valve stem. During removal of the liquid ballast, pressurized air is communicated through the adapter to pressurize a closed chamber of the tire to pump the liquid ballast to the storage tank. Upon refilling of the tire, pressurized air is communicated to the storage tank to pump liquid back into the tire.

8 Claims, 3 Drawing Figures

APPARATUS AND METHOD FOR FILLING AND REMOVING LIQUID BALLAST FROM TIRES

BACKGROUND OF THE INVENTION

Conventional rubber-tired earthworking vehicles oftentimes have their tires filled with a liquid ballast, such as water mixed with expensive anti-freeze ingredients. Such ballast primarily functions to increase the tractive effort of the vehicle during earthworking operations. Periodic emptying of the tires is normally accomplished by removing the liquid ballast by gravity drain.

SUMMARY OF THIS INVENTION

An object of this invention is to provide an economical and non-complex apparatus and method for efficiently and expeditiously filling and removing liquid ballast from a tire. The apparatus comprises a pressurized air source adapted to communicate pressurized air internally of the tire via an adapter attached to the rim thereof. A storage tank also communicates with the adapter to receive liquid ballast pumped out of the tire by the pressurized air. In the preferred embodiment of this invention, valve means are provided in the circuit for reversing the above process whereby pressurized air is communicated to the storage tank to pump the liquid back into the tire via the adapter.

BRIEF DESCRIPTION OF THE DRAWINGS

Other objects of this invention will become apparent from the following description and accompanying drawings wherein.

DETAILED DESCRIPTION

Figure 1:
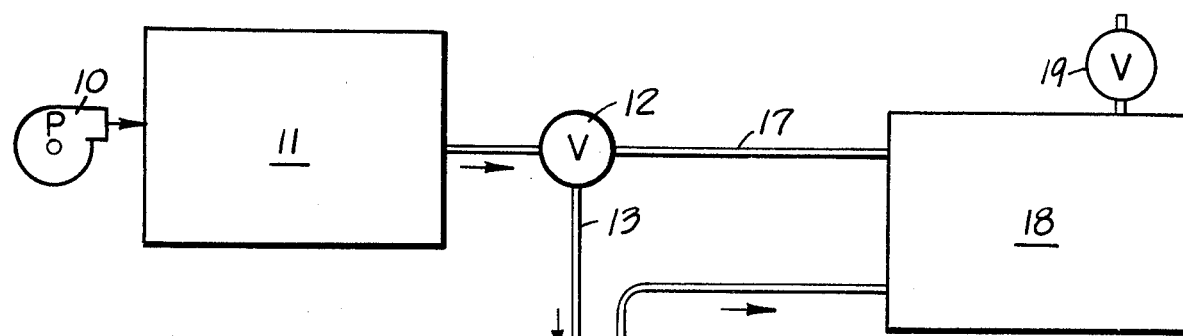
FIG. 1 schematically illustrates an apparatus of this invention in condition for removing liquid ballast from a tire.

FIG. 1 schematically illustrates an apparatus and included fluid circuit comprising a pressurized air source including a pump 10 communicating with air tank 11. The air tank is adapted to communicate pressurized air through a directional control valve 12 and into a first conduit 13 during the hereinafter described removal process. A lower end of the conduit is operatively connected to an adapter 14 attached to a rim 15 of a conventional tire 16.

Valve 12 further connects with a second conduit 17 which is, in turn, connected to a storage tank 18 adapted to retain liquid ballast, such as water, therein. An on-off vent valve 19 is operatively connected to the storage tank for purposes hereinafter explained. A third conduit 20 is operatively interconnected between a lower end of tank 18 and adapter 14, also for purposes hereinafter explained.

Figure 2:
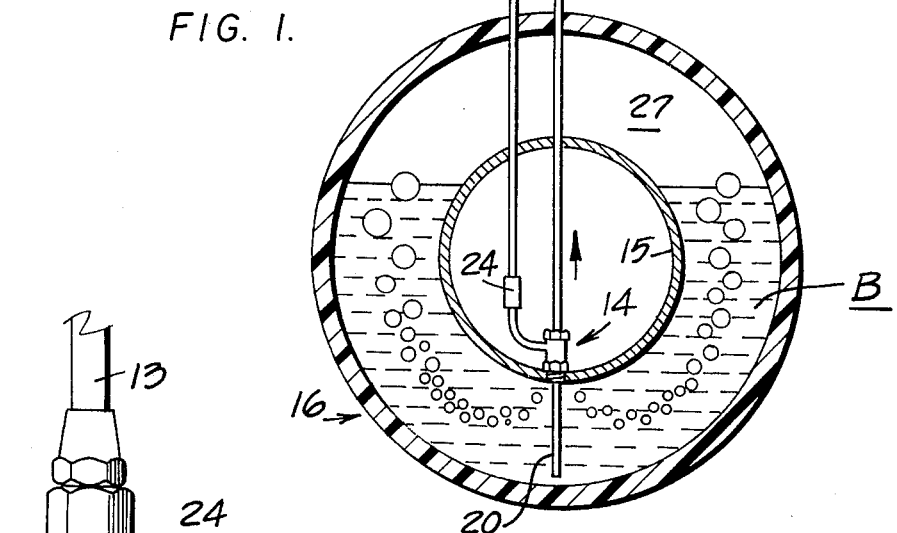
FIG. 2 is a partially sectioned view of an adapter employed in the apparatus and attached to the rim of a tire.
Figure 2:
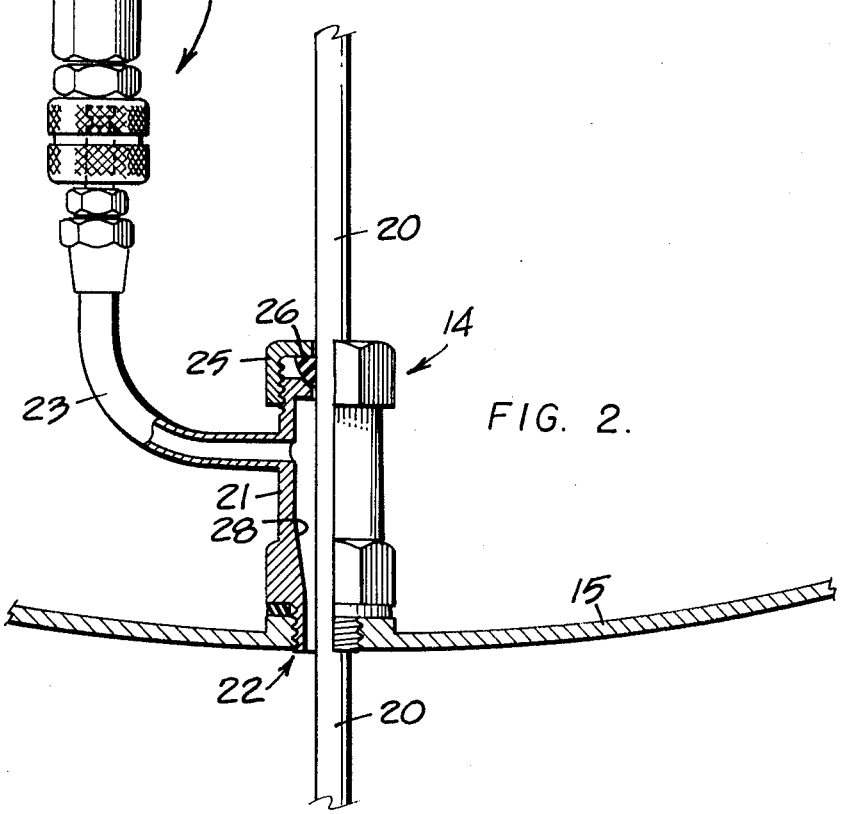

Referring to FIG. 2, adapter 14 comprises a tubular housing 21 threadably mounted at 22 on rim 15 in lieu of a conventional valve stem. A tubular elbow 23 is suitably secured on a side of the housing and releasably connected to a lower end of conduit 13 by a standard quick release coupling 24. The lower end of conduit 20 projects downwardly through housing 21 to terminate adjacent to a lower end of tire 16 and may be suitably secured in place thereon by means of an annular retainer 25 and a static annular seal 26 secured within the retainer.

FIG. 1 illustrates the apparatus and included fluid circuit in condition for removing liquid ballast B from a closed annular chamber 27 of tire 16. Valve 12 has been actuated to communicate pressurized air from tank 11 through first passage means comprising conduit 13, elbow 23 and an annular passage 28 (FIG. 2) defined between conduit 20 and housing 21. The pressurized air will function to pump liquid ballast B upwardly through a second passage means defined in conduit 20 and into reservoir 18 for reuse at a later time. During the removal of liquid ballast from the tire, valve 19 is opened to permit the egress of air therethrough and conduit 17 is closed at valve 12 to prevent the communication of pressurized air to the conduit from tank 11.

Figure 3:
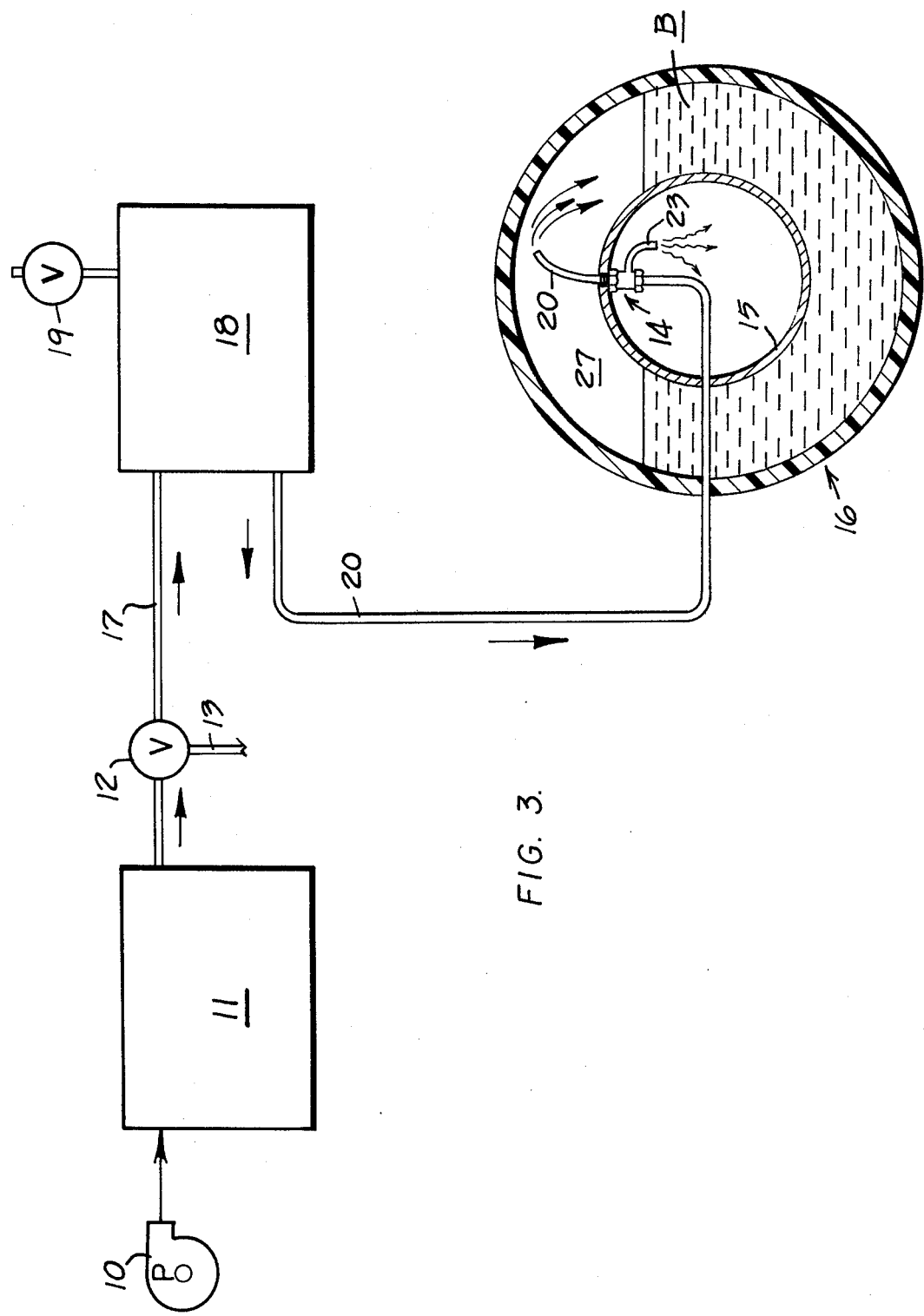
FIG. 3 schematically illustrates the apparatus of this invention as it would appear during the filling of a tire with liquid ballast.

FIG. 3 illustrates the apparatus and included fluid circuit in their filling condition of operation. In particular, valve 12 is actuated to communicate pressurized air to tank 18 via conduit 17 and to block conduit 13. During such communication of air to tank 18, valve 19 is closed to prevent the egress of air therethrough and coupling 24 is disconnected to release conduit 13 from elbow 23.

The pressurized air will function to pump liquid ballast B out of reservoir 18, through conduit 20 and into chamber 27 of tire 16. As can be seen in FIG. 3, the tire has been inverted to permit air to escape from chamber 27 via elbow 23 which has been disconnected from conduit 13. Conduits 13 and 20 preferably comprise standard flexible hoses to facilitate the above-described method steps.

We claim:

1. An apparatus in combination with a tire for removing liquid ballast from or communicating liquid ballast to the closed chamber thereof comprising
   a pressurized air source,
   first passage means for communicating said pressurized air source with the closed chamber of said tire,
   second passage means for communicating liquid ballast from said closed chamber and exteriorly of said tire in response to said pressurized air,
   a storage tank communicating with said second passage means for receiving said liquid ballast therefrom,
   third passage means for communicating said pressurized air source with said storage tank and
   first valve means operatively connected to each of said first and third passage means and movable to a first position for communicating said pressurized air source with said first passage means to pump said liquid ballast to said storage tank via said second passage means and further movable to a second position for blocking communication of said pressurized fluid source with said first passage means and for simultaneously communicating said pressurized fluid source with said storage tank via said third passage means to pump liquid ballast from said storage tank to said tire via said second passage means.

2. The apparatus of claim 1 further comprising second valve means for venting air from said storage tank when said first valve means is actuated to communicate pressurized air to said first passage means and for preventing air from escaping from said storage tank when said first valve means is actuated to communicate pressurized air to said storage tank.

3. The apparatus of claim 1 further comprising an adapter detachably mounted directly on a rim of said tire, each of said first and second passage means at least partially formed through said adapter.

4. The apparatus of claim 3 wherein said first passage means comprises a first conduit detachably connected to said adapter.

5. The apparatus of claim 4 wherein said first conduit is detachably connected to said adapter by a releasable coupling.

6. The apparatus of claim 3 wherein said second passage means comprises a conduit extending axially through said adapter and wherein said first passage means comprises an annular passage defined between said conduit and said adapter.

7. The apparatus of claim 3 wherein said adapter comprises a tubular housing threadably attached to the rim of said tire directly.

8. The apparatus of claim 7 wherein said adapter further comprises an elbow secured on a side of said housing, said second passage means comprises a conduit extending in sealing relationship axially through said housing to terminate at its lower end adjacent to a lower end of said chamber and said first passage means sequentially comprises a conduit connected to said elbow, said elbow and an annular passage defined radially between said housing and the conduit extending therethrough.

* * * * *